Nov. 3, 1959  H. V. RIDDLE  2,911,233
CLUSTER TRAILER HITCH
Filed July 11, 1958  2 Sheets-Sheet 1
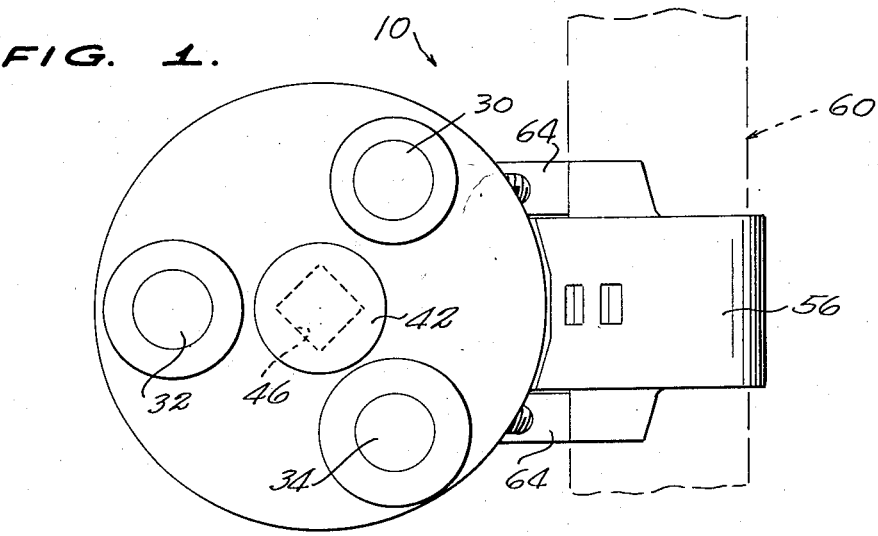
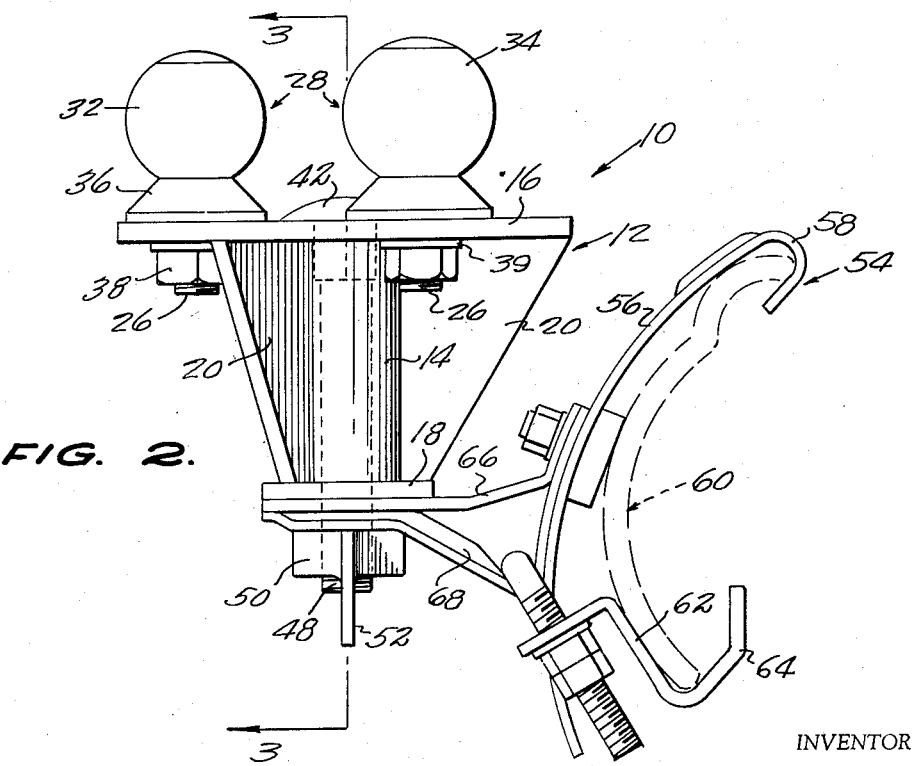
INVENTOR.
HARRY V. RIDDLE,
BY
McMorrow, Berman + Davidson
ATTORNEYS.

Nov. 3, 1959 H. V. RIDDLE 2,911,233
CLUSTER TRAILER HITCH
Filed July 11, 1958 2 Sheets-Sheet 2

INVENTOR.
HARRY V. RIDDLE,
BY
McMorrow, Berman + Davidson
ATTORNEYS.

2,911,233
CLUSTER TRAILER HITCH
Harry V. Riddle, Bloomington, Ill.

Application July 11, 1958, Serial No. 747,898

3 Claims. (Cl. 280—415)

This invention relates to improvements in trailer ball hitches, for tractor vehicles, and more particularly to an improved device of this kind which provides a cluster of hitch balls of differing diameters and heights for accommodating different trailer ball sockets.

The primary object of the invention is to provide a practical and efficient ball hitch device of the character indicated which has a plurality of upstanding hitch balls of different sizes and heights which are fixed on a pedestal which is rotatably mounted on the draw bar means on a tractor vehicle bumper, for adjustment to present selected ones of the hitch balls for engagement by a trailer hitch socket, so that the hitch device can be used, without change or substitution thereof, to haul trailers of different makes and types having hitch sockets of different sizes and elevations above the ground.

Another object of the invention is to provide a device of the character indicated above which involves simple means securing the body on the tractor vehicle mounting, which is quickly and easily operable, without tools, for rotatably adjusting the body to present a selected hitch ball for engagement by a trailer hitch socket.

Other important objects and advantageous features of the invention will be apparent from the following description and the accompanying drawings, wherein, for purposes of illustration only, a specific form of the invention is set forth in detail.

In the drawings:

Figure 1 is a top plan view of the device, mounted on a tractor vehicle bumper bar, shown in phantom lines;

Figure 2 is a side elevation of Figure 1;

Figure 3:
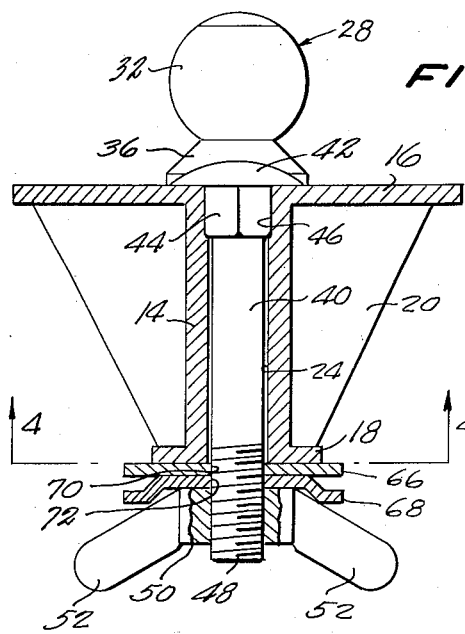
Figure 3 is a transverse vertical section taken on the line 3—3 of Figure 2.
Figure 5:
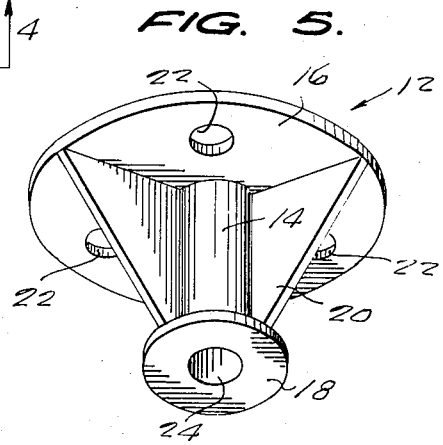
Figure 5 is a perspective view of the body of the device.
Figure 4:
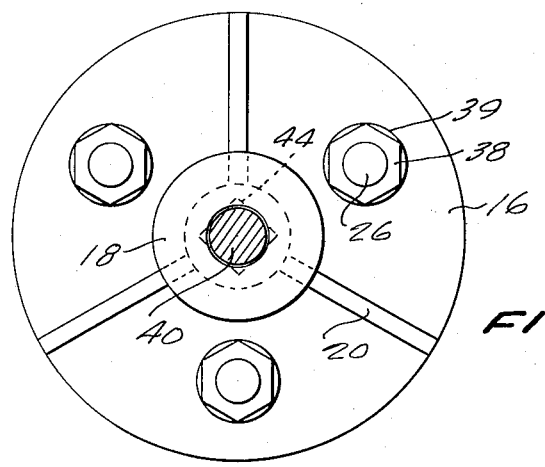
Figure 4 is a horizontal section taken on the line 4—4 of Figure 3.

Referring to the drawings in detail, wherein like numerals designate like parts throughout the several views, the illustrated device, generally designated 10, comprises a pedestal or standard 12, preferably of upwardly flaring form, which is composed of a heavy central vertical open ended tube 14 having on and around its upper end a relatively large diameter lateral annular flange 16, constituting a top plate, and on and around its lower end a smaller diameter lateral annular flange 18, constituting a bottom plate. The top plate 16, the bottom plate 18, and the tube 14 are braced relative to each other by V-shaped radial and equally circumferentially spaced V-shaped fins 20, fixed thereto, as by welding.

The top plate 16 has centered between each pair of adjacent fins 20, a hole 22, the holes 22 being preferably equally radially spaced from the bore 24 of the tube 14. Engaged downwardly in the hole 22 are the shanks 26 of hitch ball elements 28, which can be identical in form except for having small, medium and large hitch balls 30, 32 and 34, respectively of progressively greater diameters and heights. The elements 28 have below the hitch balls thereof, enlarged diameter flanges 36 which bear upon the upper side of the top plate 16, and threaded on the shanks 26 are retaining nuts 38, with washers 39 interposed between the nuts 38 and the underside of the top plate 16. This provides for replacing worn hitch ball elements 28 and for substituting hitch ball elements of other desired sizes and heights.

The pedestal 12 is designed to be mounted, in a rotatably adjustable manner, on its vertical axis, on any existing tractor vehicle draw bar means, by means of a vertical bolt 40, of the carriage type, having an enlarged head 42 on its upper end and a reduced diameter polygonal enlargement 44 at the underside of the head 42. The polygonal enlargement 44, here shown as being square, engages non-rotatably in a similarly formed socket 46 provided in the upper end of the bore 24 of the tube 14, with the bolt 40 engaged downwardly through the bore 24 and the head 42 bearing against the upper side of the pedestal top plate 16, and the threaded lower end 48 of the bolt 40 depending below the bottom plate 18, as clearly shown in Figure 3. The lower end 48 of the bolt 40 traverses the existing draw bar means and is secured thereto by means of a nut 50 threaded on the end 48 and tightened against the underside of the draw bar means.

The nut 50 is provided with relatively long radial and opposed wings 52 which enable the nut 50 to be loosened and tightened by hand, or by the use of means other than tools, such as an available rock or piece of wood or metal, used as a hammer. This provision makes it easy for a woman, for example, to manipulate the nut 50 and rotatably adjust the pedestal 12 and position a desired one of the hitch ball elements 28 in a rearward location for engagement by a trailer hitch socket (not shown).

The rotary adjusting of the pedestal 12 is done by loosening or removing the nut 50, lifting the bolt 40 to clear the polygonal enlargement 44 out of the socket 46 and turning the pedestal 12 the necessary amount; and then dropping the bolt 40 back into place and tightening the nut 50. The enlargement 44 and the socket 46 have their sides arranged to engage and properly position the pedestal 12 in the different adjused positions.

The draw bar means shown in the drawings, and generally designated 54, is a rear bumper type, and comprises an arcuate upper jaw 56 having a hook 58 on its upper end for engaging over the upper edge of a rear bumper 60, and an adjustable lower jaw 62 associated with the upper jaw, and having hooks 64 on its lower end for engagement around the lower edge of the bumper 60. Secured to and projecting rearwardly from the upper jaw 56 are rearwardly extending upper and lower draw bars 66 and 68, which are in superimposed relation and have registered holes 70 and 72, respectively, therein, which are traversed by the threaded lower end 48 of the bolt 40, with the bottom plate 18 of the pedestal 12 bearing upon the upper side of the upper bar 64, and with the wing nut 50 bearing against the underside of the lower bar 68.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A cluster trailer ball hitch comprising a pedestal having upper and lower ends and a vertical bore opening through said ends, a polygonal socket in the bore at said upper end, a plurality of upstanding hitch balls of different heights and sizes fixed on and around said upper end, a bolt extending downwardly through said bore, said bolt having a head on its upper end and a polygonal enlargement near said head for non-rotary engagement in said socket to position said pedestal in a position presenting a selected hitch ball for engagement by a trailer hitch socket, said bolt having a threaded lower end to traverse draw bar means, and a nut on said lower end for securing the hitch to draw bar means and holding said enlargement engaged in said socket.

2. A cluster trailer ball hitch comprising a drawbar, a vertically elongated pedestal having a lower plate bearing supportedly and rotatably upon said drawbar and an upper plate, said pedestal comprising a vertical tube having a vertical axial bore extending therethrough and through said lower and upper plates, said bore having a polygonal socket in one of its ends, a bolt extending through said bore and traversing said drawbar and having an enlarged head bearing against one of said plates, a polygonal portion on said bolt engaging said polygonal socket, a nut threaded on the bolt and bearing against the side of the drawbar remote from the pedestal, and a plurality of different hitch balls fixed on and upstanding from said upper plate at intervals around said tube.

3. A cluster trailer ball hitch comprising a drawbar, a vertically elongated pedestal having a lower plate bearing supportably and rotatably upon said drawbar and an upper plate, said pedestal comprising a vertical tube having a vertical axial bore extending therethrough and through said lower and upper plates, said bore having a polygonal socket in one of its ends, a bolt extending through said bore and traversing said drawbar and having an enlarged head bearing against one of said plates, a polygonal portion on said bolt engaging said polygonal socket, a nut threaded on the bolt and bearing against the side of the drawbar remote from the pedestal, and a plurality of different hitch balls fixed on and upstanding from said upper plate at intervals around said tube, said upper plate being substantially larger in diameter than said tube, said hitch balls being positioned at equal circumferential intervals around said upper plate with their centers spaced equally from the center of the upper plate, and vertical braces extending between said plates between the hitch balls.

References Cited in the file of this patent

UNITED STATES PATENTS

| | | |
|---|---|---|
| 2,506,090 | Lee | May 2, 1950 |
| 2,568,425 | Weeks et al. | Sept. 18, 1951 |
| 2,642,295 | Rieman | June 16, 1953 |
| 2,827,307 | Osborne | Mar. 18, 1958 |

FOREIGN PATENTS

| | | |
|---|---|---|
| 463,395 | Germany | July 27, 1928 |